US012598292B2

(12) United States Patent
Kim et al.

(10) Patent No.: US 12,598,292 B2
(45) Date of Patent: *Apr. 7, 2026

(54) INTRA MODE CANDIDATE CONFIGURATION METHOD AND VIDEO DECODING APPARATUS

(71) Applicant: SK TELECOM CO., LTD., Seoul (KR)

(72) Inventors: Jae Il Kim, Seoul (KR); Sun Young Lee, Seoul (KR); Kyung Hwan Ko, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,658

(22) Filed: Jun. 20, 2024

(65) Prior Publication Data

US 2024/0340408 A1      Oct. 10, 2024

Related U.S. Application Data

(63) Continuation of application No. 17/614,493, filed as application No. PCT/KR2020/006817 on May 27, 2020, now Pat. No. 12,058,313.

(30) Foreign Application Priority Data

May 27, 2019    (KR) ........................ 10-2019-0061736
Nov. 6, 2019    (KR) ........................ 10-2019-0140649

(51) Int. Cl.
*H04N 19/105*        (2014.01)
*H04N 19/132*        (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
CPC .. H04N 19/105; H04N 19/132; H04N 19/159; H04N 19/176; H04N 19/186
(Continued)

(56) References Cited

U.S. PATENT DOCUMENTS

2011/0248873 A1* 10/2011 Karczewicz ......... H04N 19/196
                                                    341/67
2014/0098859 A1    4/2014 Lim et al.
(Continued)

FOREIGN PATENT DOCUMENTS

| KR | 10-2019-0015216 A | 2/2019 |
| KR | 10-2019-0033559 A | 3/2019 |
| WO | 2012/134246 A3 | 10/2012 |

OTHER PUBLICATIONS

International Search Report issued on Aug. 31, 2020, for corresponding International Patent Application No. PCT/ KR2020/ 006817, 7 pages.
(Continued)

*Primary Examiner* — Nguyen T Truong
(74) *Attorney, Agent, or Firm* — Hauptman Ham, LLP

(57)        ABSTRACT

A method of configuring candidate intra modes and a video decoding apparatus are disclosed. At least one embodiment of the present disclosure provides a method of configuring candidate intra modes for a chroma block, including determining whether a luma region corresponding to the chroma block has an encoding mode that is available for use, setting a direct mode (DM) among the candidate intra modes as a
(Continued)

default mode when the encoding mode of the luma region is not available, and configuring the candidate intra modes by including the DM.

13 Claims, 17 Drawing Sheets

(51) Int. Cl.
*H04N 19/159* (2014.01)
*H04N 19/176* (2014.01)
*H04N 19/186* (2014.01)

(58) Field of Classification Search
USPC .................................................. 375/240.02
See application file for complete search history.

(56) References Cited

U.S. PATENT DOCUMENTS

| | | |
|---|---|---|
| 2015/0245077 A1 | 8/2015 | Lim et al. |
| 2016/0255374 A1 | 9/2016 | Lim et al. |
| 2018/0048889 A1 | 2/2018 | Zhang et al. |
| 2018/0063553 A1 | 3/2018 | Zhang et al. |
| 2018/0278966 A1 | 9/2018 | Lim et al. |
| 2019/0104303 A1 | 4/2019 | Xiu et al. |
| 2019/0313130 A1 | 10/2019 | Zhang et al. |
| 2021/0218968 A1* | 7/2021 | Chernyak ............ H04N 19/176 |

OTHER PUBLICATIONS

Written Opinion issued on Aug. 31, 2020, for corresponding International Patent Application No. PCT/KR2020/006817, 4 pages.
Feiyang Zeng et al., "Non-CE3: Chroma Intra Default Modes Modification Based on Order of Luminance Modes," Joint Video Experts Team (JVET) of ITU-T SG 16 WP 3 and ISO/IEC JTC 1/SC 29/WG 11, Document: JVET-N0154, 14th Meeting: Geneva, CH, pp. 1-3, Mar. 12, 2019; cited in NPL Nos. 1 and 2.
Benjamin Bross et al., "Versatile Video Coding (Draft 5)," Joint Video Experts Team (JVET) of ITU-T SG 16 WP 3 and ISO/IEC JTC 1/SC 29/WG 11, Document: JVET-N1001-v6, 14th Meeting: Geneva, CH, pp. 1-367, Mar. 23, 2019; cited in NPL Nos. 1 and 2.

* cited by examiner (a) luma block partition (b) chroma block partition (a) luma (b) chroma

| #1 | #2 | #4 | | |
|----|----|----|----|----|
| | #3 | #5 | #6 | #9 |
| | | #7 | #8 | |
| #10 | | #11 | | |
| | | #12 | #13 | #16 |
| | | #14 | #15 | |

(a) luma intra mode

| #1 | #1 | #2 | #2 | #4 | #4 | #4 | #4 |
|-----|-----|-----|-----|-----|-----|-----|-----|
| #1 | #1 | #2 | #2 | #4 | #4 | #4 | #4 |
| #1 | #1 | #3 | #3 | #5 | #6 | #9 | #9 |
| #1 | #1 | #3 | #3 | #7 | #8 | #9 | #9 |
| #10 | #10 | #10 | #10 | #11 | #11 | #11 | #11 |
| #10 | #10 | #10 | #10 | #11 | #11 | #11 | #11 |
| #10 | #10 | #10 | #10 | #12 | #13 | #16 | #16 |
| #10 | #10 | #10 | #10 | #14 | #15 | #16 | #16 |

(b) luma intra mode (4x4 in memory)

FIG. 12

(a) luma (b) chroma (a) luma (b) chroma

INTRA MODE CANDIDATE CONFIGURATION METHOD AND VIDEO DECODING APPARATUS

CROSS-REFERENCE TO RELATED APPLICATION

This present application is a continuation of U.S. patent application Ser. No. 17/614,493 filed on Nov. 26, 2021, which is a national phase of PCT/KR2020/006817 filed on May 27, 2020, which is based on and claims priority to Korean Patent Application No. 10-2019-0061736 filed on May 27, 2019, and Korean Patent Application No. 10-2019-0140649 filed on Nov. 6, 2019, the disclosures of which are incorporated by reference herein in their entireties.

TECHNICAL FIELD

The present disclosure in some embodiments relates to the encoding and decoding of images or a video. More particularly, the present disclosure relates to a method of configuring candidate intra modes and an apparatus for encoding/decoding a video to improve encoding and decoding efficiency.

BACKGROUND

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of videos in size, resolution, and frame rate and the resultant increase of data amount to be encoded require a new and superior compression technique with better coding efficiency and higher image quality improvement over existing compression techniques.

SUMMARY

Technical Problem

The present disclosure seeks to provide an improved video encoding and decoding technology to meet these needs, and in particular, at least one aspect of the present disclosure is to provide techniques for improving the efficiency of video encoding and decoding by a new method of configuring candidate intra modes for a chroma block.

Technical Solution

At least one aspect of the present disclosure provides a method of configuring candidate intra modes for a chroma block, including determining whether a luma region corresponding to the chroma block has an encoding mode that is available for use, setting a direct mode (DM) among the candidate intra modes as a default mode when the encoding mode of the luma region is not available, and configuring the candidate intra modes by including the DM.

Another aspect of the present disclosure provides a video decoding apparatus, including a determination unit, a setting unit, and a configuration unit. The determination unit is configured to determine whether a luma region corresponding to a chroma block has an encoding mode that is available for use. The setting unit is configured to set a direct mode (DM) among candidate intra modes of the chroma block as a default mode when the encoding mode of the luma region is not available. The configuration unit is configured to configure the candidate intra modes by including the DM.

Advantageous Effects

As described above, according to at least one embodiment of the present disclosure, an efficient selection of candidate intra modes for a chroma block and more precise prediction of the chroma block can result in improved compression performance.

BRIEF DESCRIPTION OF THE DRAWINGS

FIG. 12 is a diagram illustrating an encoding mode of a luma region.

DETAILED DESCRIPTION

Figure 1:
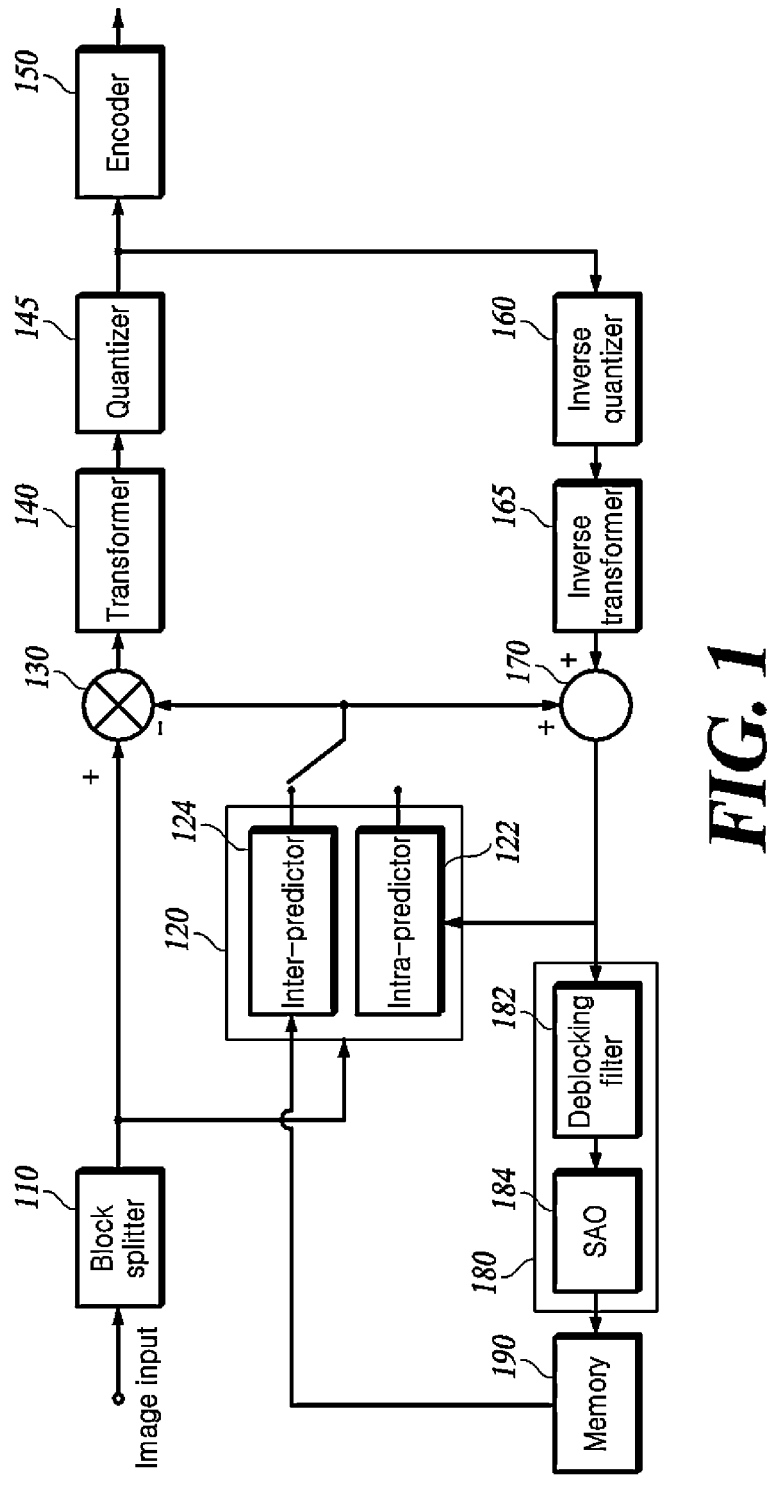
FIG. 1 is a block diagram illustrating a video encoding apparatus that can implement the techniques of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

FIG. 1 is a block diagram illustrating a video encoding apparatus that can implement the techniques of the present disclosure. Hereinafter, a video encoding apparatus and sub-components of the apparatus will be described with reference to FIG. 1.

The video encoding apparatus may be configured including a block splitter 110, a prediction unit 120, a subtractor 130, a transformer 140, a quantizer 145, an encoder 150, an inverse quantizer 160, an inverse transformer 165, an adder 170, a filter unit 180, and a memory 190.

The respective components of the video encoding apparatus may be implemented as hardware or software, or hardware and software combined. Additionally, the function of each component may be implemented by software and the function by software for each component may be implemented to be executed by a microprocessor.

A video is composed of a plurality of pictures. The pictures are each split into a plurality of regions, and encoding is performed for each region. For example, one picture is split into one or more tiles or/and slices. Here, one or more tiles may be defined as a tile group. Each tile or/and slice is split into one or more Coding Tree Units (CTUs). And each CTU is split into one or more Coding Units (CUs) by a tree structure. Information applied to the respective CUs are encoded as syntaxes of the CUs, and information commonly applied to CUs included in one CTU is encoded as a syntax of the CTU. Additionally, information commonly applied to all blocks in one tile is encoded as a syntax of a tile or as a syntax of a tile group that is a collection of tiles, and information applied to all blocks constituting one picture is encoded in a Picture Parameter Set (PPS) or a picture header. Furthermore, information commonly referenced by a plurality of pictures is encoded in a Sequence Parameter Set (SPS). Additionally, information commonly referenced by one or more SPSs is encoded in a Video Parameter Set (VPS).

The block splitter 110 determines the size of the coding tree unit (CTU). Information on the size of the CTU (CTU size) is encoded as a syntax of the SPS or PPS and transmitted to a video decoding apparatus.

The block splitter 110 splits each picture constituting the video into a plurality of coding tree units (CTUs) having a predetermined size and then uses a tree structure to split the CTUs recursively. A leaf node in the tree structure becomes a coding unit (CU), which is a basic unit of encoding.

A tree structure for use may be a QuadTree (QT) in which an upper node (or parent node) is split into four equally sized lower nodes (or child nodes), a BinaryTree (BT) in which an upper node is split into two lower nodes, a TernaryTree (TT) in which an upper node is split into three lower nodes in a size ratio of 1:2:1, or a mixture of two or more of the QT structure, BT structure, and TT structure. For example, a QuadTree plus Binary Tree (QTBT) structure may be used, or a QuadTree plus BinaryTree TernaryTree (QTBTTT) structure may be used. Here, BTTT may be collectively referred to as a Multiple-Type Tree (MTT).

Figure 2:
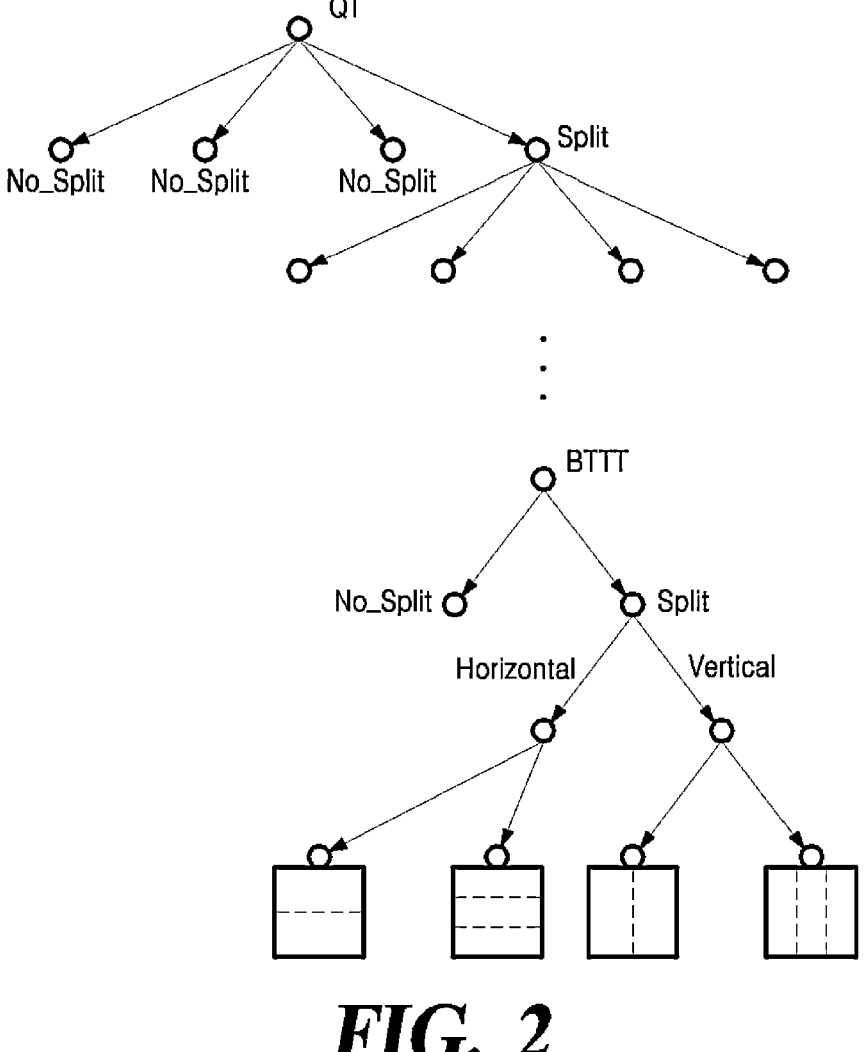
FIG. 2 is a diagram for explaining a method of partitioning or splitting a block by using a QTBTTT structure.

FIG. 2 shows a QTBTTT split tree structure. As shown in FIG. 2, the CTU may be first split into a QT structure. The quadtree splitting may be repeated until the size of a splitting block reaches the minimum block size (MinQTSize) of a leaf node allowed in QT. A first flag (QT_split_flag) indicating whether each node of the QT structure is split into four nodes of a lower layer is encoded by the encoder 150 and signaled to the video decoding apparatus. When the leaf node of the QT is not larger than the maximum block size (MaxBTSize) of the root node allowed in the BT, it may be further split into any one or more of the BT structure or the TT structure. In the BT structure and/or the TT structure, there may be a plurality of split directions. For example, there may be two directions in which the block of the relevant node is split horizontally and vertically. As shown in FIG. 2, when MTT splitting starts, a second flag (mtt_split_flag) indicating whether the nodes are split, and if yes, a further flag indicating split directions (vertical or horizontal) and/or a flag indicating partition or split type (binary or ternary) are encoded by the encoder 150 and signaled to the video decoding apparatus.

As another example of the tree structure, when a block is split using the QTBTTT structure, information on a CU split flag (split_cu_flag) indicating that the node was split is first encoded and signaled and then a QT split flag (split_qt_flag) information indicating whether the split type is QT split is encoded by the encoder 150 and signaled to the video decoding apparatus. When the CU split flag (split_cu_flag) value indicates that the node was not split, the block of that node becomes a leaf node in the split tree structure and turns into a coding unit (CU), which is a basic unit of coding. When the CU split flag (split_cu_flag) value indicates that the node was split, the video encoding apparatus classifies the split type into QT split or MTT split. When the split type is QT split, there is no additional information. When the split type is MTT split, one or both of flags are additionally encoded and signaled by the encoder 150 and signaled to the video decoding apparatus, which are a flag (mtt_split_cu_vertical_flag) indicating the MTT split direction (vertical or horizontal) and a flag (mtt_split_cu_binary_flag) indicating the MTT split type (binary or ternary).

As yet another example of the tree structure, when QTBT is used, there may be two types of partition including a type that horizontally splits the block of the relevant node into two equally sized blocks (i.e., symmetric horizontal splitting) and a type that splits the same vertically (i.e., symmetric vertical splitting). Encoded by the encoder 150 and transmitted to the video decoding apparatus are a split flag (split_flag) indicating whether each node of the BT structure is split into blocks of a lower layer and partition type information indicating its partition type. Meanwhile, there may be a further type in which the block of the relevant node is split into two asymmetrically formed blocks. The asymmetric form may include a form of the block of the relevant node being split into two rectangular blocks having a size ratio of 1:3 or a form of the block of the relevant node being split in a diagonal direction.

A CU may have various sizes depending on the QTBT or QTBTTT split of the CTU. Hereinafter, a block corresponding to a CU to be encoded or decoded (i.e., a leaf node of QTBTTT) is referred to as a 'current block'.

The prediction unit 120 predicts the current block to generate a prediction block. The prediction unit 120 includes an intra predictor 122 and an inter predictor 124.

In general, the current blocks in a picture may each be predictively encoded. Prediction of the current block may be generally performed using an intra prediction technique or inter prediction technique. The intra prediction technique uses data from a picture containing the current block, and the inter prediction technique uses data from the preceding picture coded before the picture containing the current block. Inter prediction includes both unidirectional prediction and bidirectional prediction.

Figure 3:
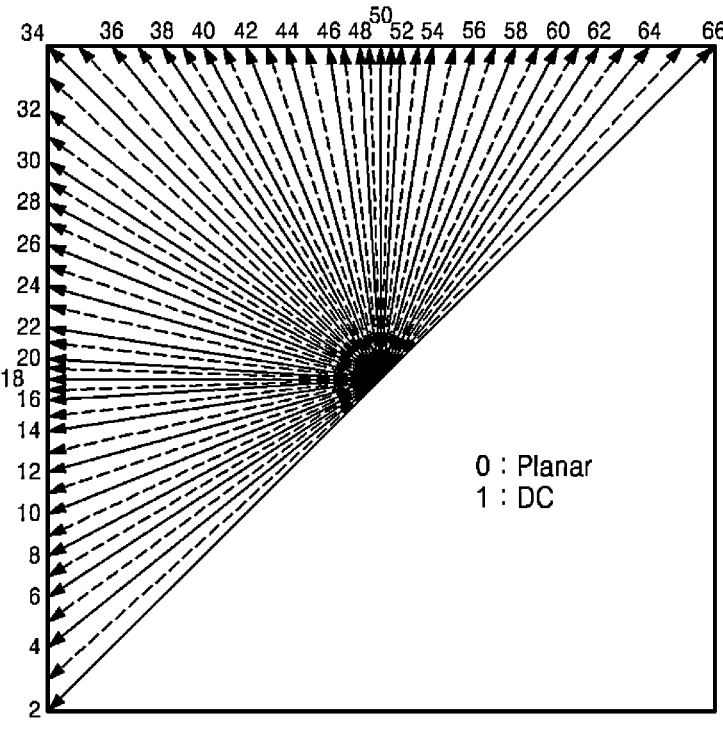
FIG. 3 is a diagram of multiple intra prediction modes.

The intra predictor 122 predicts pixels in the current block by using the neighboring pixels (reference pixels) located around the current block in the current picture. There are multiple intra prediction modes depending on different prediction directions. For example, as shown in FIG. 3, the multiple intra prediction modes may include 2 non-directional modes including a planar mode and a DC mode and 65 directional modes. Neighboring pixels and an equation to be used are defined differently for each prediction mode.

The intra predictor 122 may determine an intra prediction mode to be used for encoding the current block. In some examples, the intra predictor 122 may encode the current block by using several intra prediction modes and select an appropriate intra prediction mode to use from tested modes. For example, the intra predictor 122 may calculate rate-distortion values through rate-distortion analysis of several tested intra prediction modes and select an intra prediction mode that has the best rate-distortion characteristics among the tested modes.

The intra predictor 122 selects one intra prediction mode from among a plurality of intra prediction modes and predicts the current block by using at least one neighboring pixel (reference pixel) determined according to the selected intra prediction mode and calculation formula. Information on the selected intra prediction mode is encoded by the encoder 150 and transmitted to the video decoding apparatus.

The inter predictor 124 generates a prediction block for the current block through a motion compensation process. The inter predictor 124 searches for a block most similar to the current block in the encoded and decoded reference picture before the current picture, and generates a prediction block of the current block by using the searched block. Then, the inter predictor 124 generates a motion vector corresponding to the displacement between the current block in the current picture and the prediction block in a reference picture. In general, motion estimation is performed on a luma component, and a motion vector calculated based on the luma component is used for both the luma component and the chroma component. Motion information including information on the reference picture and information on the motion vector used to predict the current block is encoded by the encoder 150 and transmitted to the video decoding apparatus.

The subtractor 130 generates a residual block by subtracting, from the current block, the prediction block generated by the intra predictor 122 or the inter predictor 124.

The transformer 140 transforms the residual signal in the residual block having pixel values in the spatial domain into transform coefficients in the frequency domain. The transformer 140 may transform the residual signals in the residual block by using the residual block in full size as a transform unit, or separate the residual block into two subblocks, which are a transform region and a non-transform region, and use only the transform-region subblock as a transform unit to transform the residual signals. Here, the transform-region subblock may be one of two rectangular blocks having a size ratio of 1:1 based on the horizontal axis (or vertical axis). In this case, the flag (cu_sbt_flag) indicating that only the subblock is transformed, directional or vertical/horizontal information (cu_sbt_horizontal_flag), and/or position information (cu_sbt_pos_flag) are encoded by the encoder 150 and signaled to the video decoding apparatus. Additionally, the size of the transform-region subblock may have a size ratio of 1:3 based on the horizontal axis (or vertical axis), wherein the flag (cu_sbt_quad_flag) identifying that partition is additionally encoded by the encoder 150 and signaled to the video decoding apparatus.

The quantizer 145 quantizes the transform coefficients outputted from the transformer 140 and outputs the quantized transform coefficients to the encoder 150.

The encoder 150 uses various encoding methods such as Context-based Adaptive Binary Arithmetic Code (CABAC) and the like for encoding the quantized transform coefficients to generate a bitstream. The encoder 150 encodes information on block partition, such as CTU size, CU split flag, QT split flag, MTT split type, and MTT split direction related to the block partition for allowing the video decoding apparatus to split the block in the same way as the video encoding apparatus does.

Additionally, the encoder 150 encodes information on a prediction type indicating whether the current block is encoded by intra prediction or inter prediction, and encodes intra prediction information (i.e., information on intra prediction mode) or inter prediction information (i.e., information on reference pictures and motion vectors), depending on the prediction type.

The inverse quantizer 160 inversely quantizes the quantized transform coefficients outputted from the quantizer 145 to generate transform coefficients. The inverse transformer 165 transforms the transform coefficients outputted from the inverse quantizer 160 from the frequency domain to the spatial domain to reconstruct the residual block.

The adder 170 adds up the reconstructed residual block and the prediction block generated by the prediction unit 120 to reconstruct the current block. Pixels in the reconstructed current block are used as reference pixels when intra-predicting the next block.

The filter unit 180 performs filtering on the reconstructed pixels to reduce blocking artifacts, ringing artifacts, blurring artifacts, etc. generated due to block-based prediction and transform/quantization. The filter unit 180 may include a deblocking filter 182 and a sample adaptive offset (SAO) filter 184.

The deblocking filter 180 filters the boundary between the reconstructed blocks to remove a blocking artifact caused by block-by-block encoding/decoding, and the SAO filter 184 performs additional filtering on the deblocking filtered video. The SAO filter 184 is a filter used to compensate for a difference between a reconstructed pixel and an original pixel caused by lossy coding.

The reconstructed block is filtered through the deblocking filter 182 and the SAO filter 184 and stored in the memory 190. When all blocks in one picture are reconstructed, the reconstructed picture may be used as a reference picture for inter-prediction of blocks in the next picture to be encoded.

Figure 4:
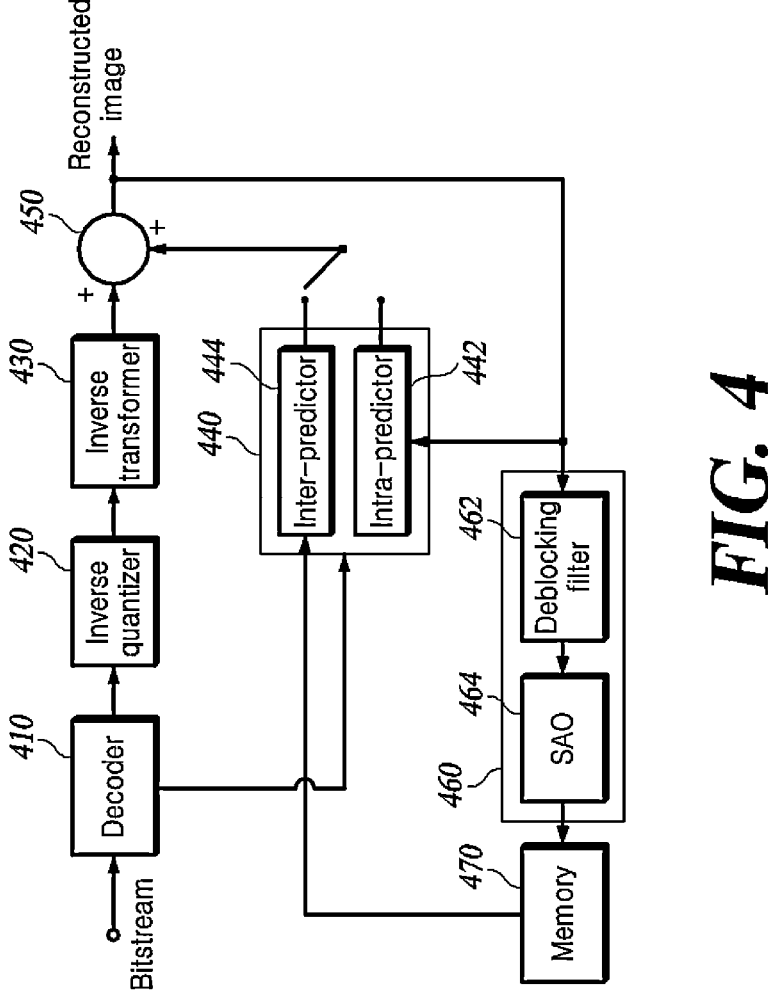
FIG. 4 is a block diagram illustrating a video decoding apparatus capable of implementing the techniques of the present disclosure.

FIG. 4 is a functional block diagram illustrating a video decoding apparatus capable of implementing the techniques of the present disclosure. Hereinafter, the video decoding apparatus and sub-components of the apparatus will be described referring to FIG. 4.

The video decoding apparatus may be configured including a decoder 410, an inverse quantizer 420, an inverse transformer 430, a prediction unit 440, an adder 450, a filter unit 460, and a memory 470.

As with the video encoding apparatus of FIG. 1, the respective components of the video decoding apparatus may be implemented as hardware or software, or hardware and software combined. Additionally, the function of each component may be implemented by software and the function by software for each component may be implemented to be executed by a microprocessor.

The decoder 410 decodes the bitstream generated by the video encoding apparatus and extracts information on block partition to determine the current block to be decoded, and extracts prediction information required to reconstruct the current block and information on residual signal, etc.

The decoder 410 extracts information on the CTU size from a sequence parameter set (SPS) or a picture parameter set (PPS), determines the size of the CTU, and splits the picture into CTUs of the determined size. Then, the decoder 410 determines the CTU as the highest layer, i.e., the root node of the tree structure, and extracts the split information on the CTU, and thereby splits the CTU by using the tree structure.

For example, when splitting the CTU by using the QTBTTT structure, a first flag (QT_split_flag) related to QT splitting is first extracted and each node is split into four nodes of a lower layer. For the node corresponding to the leaf node of QT, the decoder 410 extracts the second flag (MTT_split_flag) related to the partition of MTT and information of the split direction (vertical/horizontal) and/or split type (binary/ternary) to split that leaf node into an MTT structure. This allows the respective nodes below the leaf node of QT to be recursively split into a BT or TT structure.

As another example, when splitting the CTU by using the QTBTTT structure, the decoder 410 first extracts a CU split flag (split_cu_flag) indicating whether a CU is split, and upon splitting the relevant block, it extracts QT split flag (split_qt_flag). When the partition type is MTT, not QT, the decoder 410 further extracts the flag (mtt_split_cu_vertical_flag) indicating the MTT split direction (vertical or horizontal) and/or the flag (mtt_split_cu_binary_flag) indicating the MTT split type (binary or ternary). In the splitting process, each node may have zero or more recursive QT splits followed by zero or more recursive MTT splits. For example, the CTU may immediately enter MTT split, or conversely, have multiple QT splits alone.

As yet another example, when splitting the CTU by using the QTBT structure, the decoder 410 extracts a first flag (QT_split_flag) related to QT splitting to split each node into four nodes of a lower layer. And, for a node corresponding to a leaf node of QT, the decoder 410 extracts a split flag (split_flag) indicating whether that node is or is not further split into BT and split direction information.

Meanwhile, when the decoder 410 determines the current block to be decoded through the tree-structure splitting, it extracts information on a prediction type indicating whether the current block was intra-predicted or inter-predicted. When the prediction type information indicates intra prediction, the decoder 410 extracts a syntax element for intra prediction information (intra prediction mode) of the current block. When the prediction type information indicates inter prediction, the decoder 410 extracts a syntax element for the inter prediction information, that is, information indicating a motion vector and a reference picture referenced by the motion vector.

Meanwhile, the decoder 410 extracts information on the quantized transform coefficients of the current block as information on the residual signal.

The inverse quantizer 420 inversely quantizes the quantized transform coefficients. The inverse transformer 430 inversely transforms the inverse quantized transform coefficients from the frequency domain to the spatial domain to reconstruct the residual signals and thereby generates a reconstructed residual block of the current block.

Additionally, when the inverse transformer 430 inversely transforms only a partial region (subblock) of the transform block, it extracts a flag (cu_sbt_flag) indicating that only the subblock of the transform block has been transformed, the subblock's directional (vertical/horizontal) information (cu_sbt_horizontal_flag), and/or subblock's position information (cu_sbt_pos_flag), and inversely transforms the transform coefficients of that subblock from the frequency domain to the spatial domain to reconstruct the residual signals. At the same time, the inverse transformer 430 fills the remaining region of the transform block left untransformed inversely with the "0" value for the residual signals and thereby generates the final residual block for the current block.

The prediction unit 440 may include an intra predictor 442 and an inter predictor 444. The intra predictor 442 is activated when the prediction type of the current block is intra prediction, and the inter predictor 444 is activated when the prediction type of the current block is inter prediction.

The intra predictor 442 determines, among a plurality of intra prediction modes, the intra prediction mode of the current block from the syntax element for the intra prediction mode extracted by the decoder 410, and according to the determined intra prediction mode, it predicts the current block by using neighboring reference pixels of the current block.

The inter predictor 444 utilizes the syntax element for inter prediction information extracted by the decoder 410 to determine a motion vector of the current block and a reference picture referenced by the motion vector, and it predicts the current block by using the motion vector and the reference picture as determined.

The adder 450 adds up the residual block outputted from the inverse transformer and the prediction block outputted from the inter predictor or the intra predictor to reconstruct the current block. Pixels in the reconstructed current block are used as reference pixels when intra-predicting a coming block to be decoded.

The filter unit 460 may include a deblocking filter 462 and an SAO filter 464. The deblocking filter 462 deblocks and filters the boundary between reconstructed blocks to remove a blocking artifact caused by block-by-block decoding. The SAO filter 464 performs additional filtering on the reconstructed block after deblocking filtering to compensate for the difference between the reconstructed pixel and the original pixel caused by lossy coding. The reconstructed block is filtered through the deblocking filter 462 and the SAO filter 464 and stored in the memory 470. When all blocks in one picture are reconstructed, the reconstructed picture is used as a reference picture for inter-prediction of blocks in a picture to be encoded thereafter.

In an intra prediction method for predicting a current block using the information on a reference sample, a plurality of intra prediction modes exists. The video encoding apparatus selects, from among a plurality of intra prediction modes, one mode applied to the current block and signals the selected mode to the video decoding apparatus.

Figure 5:
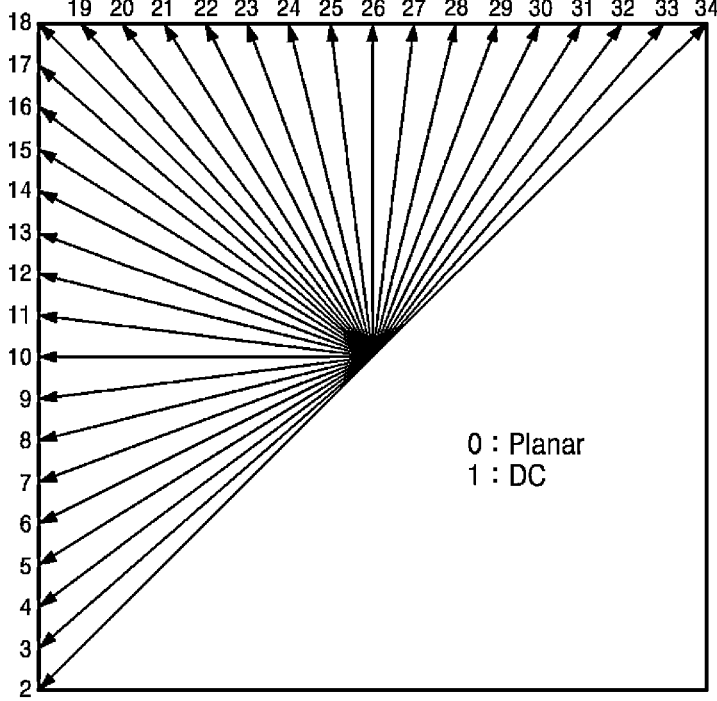
FIGS. 5 to 7 are diagrams for explaining a conventional method for intra prediction.

As expressed by FIG. 5, the conventional method (HEVC) uses 35 intra prediction modes. Among the 35 intra prediction modes, there are 33 directional prediction modes and 2 non-directional prediction modes.

In case of a luma block composed of luminance components in the current block, to encode the final intra prediction mode, three MPMs are selected for that block by using modes of neighboring blocks of that block and the modes most often used statistically. A 1-bit MPM flag is transmitted for indicating whether the final mode of that block is the same as one of the MPMs, and if the final mode is one of the MPMs, an MPM index value is further transmitted. If the final mode is not the MPM, a non-MPM index value is transmitted for indicating which mode among the remaining modes is the final mode.

Meanwhile, for a chroma block made of chrominance components in the current block, candidate intra modes are composed of some of a total of 35 intra prediction modes, and the intra prediction mode of the chroma block is selected from among the composed candidates. Then, information for indicating the selected candidate is signaled. As shown in Table 1 below, candidate intra modes (intra_chroma_pred_mode [xCb][yCb]) are composed of 0: planar mode, 1: vertical mode, 2: horizontal mode, 3: DC mode, and 4: direct mode (DM). Here, DM refers to an intra prediction mode (IntraPredModeY [xCb][yCb]) of a luma block or a luma region corresponding to a chroma block.

TABLE 1

| intra_chroma_pred_mode[ xCb ][ yCb ] | IntraPredModeY[ xCb ][ yCb ] | | | | |
|---|---|---|---|---|---|
| | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

When the DM is the same as one of the remaining modes, that is, 0: planar mode, 1: vertical mode, 2: horizontal mode, and 3: DC mode, directional mode No. 34 is added to provide a composition of 5 candidate intra modes in total. For example, when the intra prediction mode of the luma block is vertical mode, the DM becomes the vertical mode, and thereby the candidate intra modes are composed of 0: planar mode, 1: directional mode No. 34, 2: horizontal mode, 3: DC mode, and 4: DM mode. In other words, the directional mode No. 34 fills the position of the vertical mode.

Mode indexes and codewords for the 5 candidate intra modes are shown in Table 2 below.

TABLE 2

| Value of intra_chroma_pred_mode | Bin string |
|---|---|
| 4 | 0 |
| 0 | 100 |
| 1 | 101 |
| 2 | 110 |
| 3 | 111 |

In the intra prediction method, there is a current picture referencing (cpr) mode used in the HEVC extension. In this mode, also called intra block copy (ibc), as shown in FIG. 6, prediction information of a current block is obtained from another block (reference block) that is located in the same picture, i.e., current picture.

Figure 6:
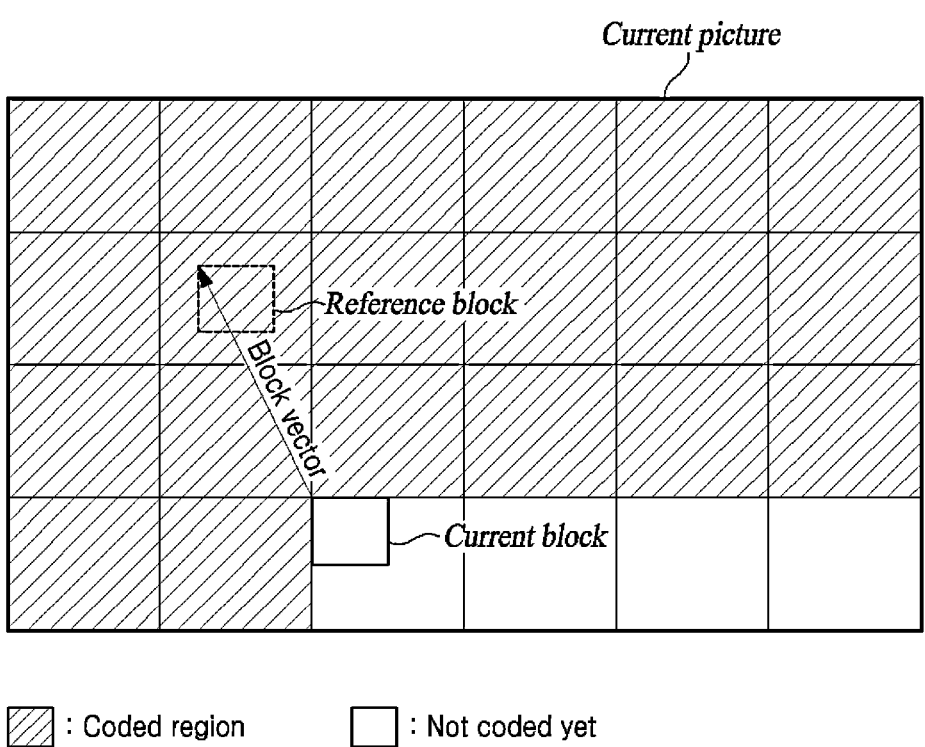

Among the blocks included in the current picture of FIG. 6, blocks marked with a pattern of hatched lines correspond to blocks or regions (coded region) for which decoding has been completed, and blocks not marked with a pattern correspond to blocks or regions (not coded yet), for which decoding is not completed. Accordingly, the reference block for allowing to obtain the prediction information of the current block corresponds to the coded block. The reference block is indicated by a motion vector (MV), and in the ibc mode, this motion vector may be referred to as a block vector.

In the ibc mode, the prediction information of the current block is obtained from the reference block indicated by the MV, whereas in the intra mode, prediction information is obtained from pixels adjacent to the current block. Additionally, in the ibc mode, the prediction information is obtained from the reference block located in the same picture, whereas in the inter mode, prediction information is obtained from a reference block located in a different picture. The ibc mode may be a coding method more suitable for screen contents coding (SCC) for content such as animation rather than an ordinary live-action video.

Although the ibc mode is an intra prediction method, the syntax and semantics of a block that is coded in the ibc mode use the very structure and meaning of the inter prediction method. In other words, although it is an intra prediction method, the ibc mode is expressed as being an inter prediction method of a unique type in which the reference picture is the current picture. For ibc mode, the current picture is added to the reference picture list 0.

The video decoding apparatus may determine whether the current block is encoded in the ibc mode based on whether a reference picture used for the prediction of the current block is the current picture. For example, the current block as utilizing inter prediction and the signaled reference picture information as indicating the current picture signify that the block has been encoded in the ibc mode.

Figure 7:
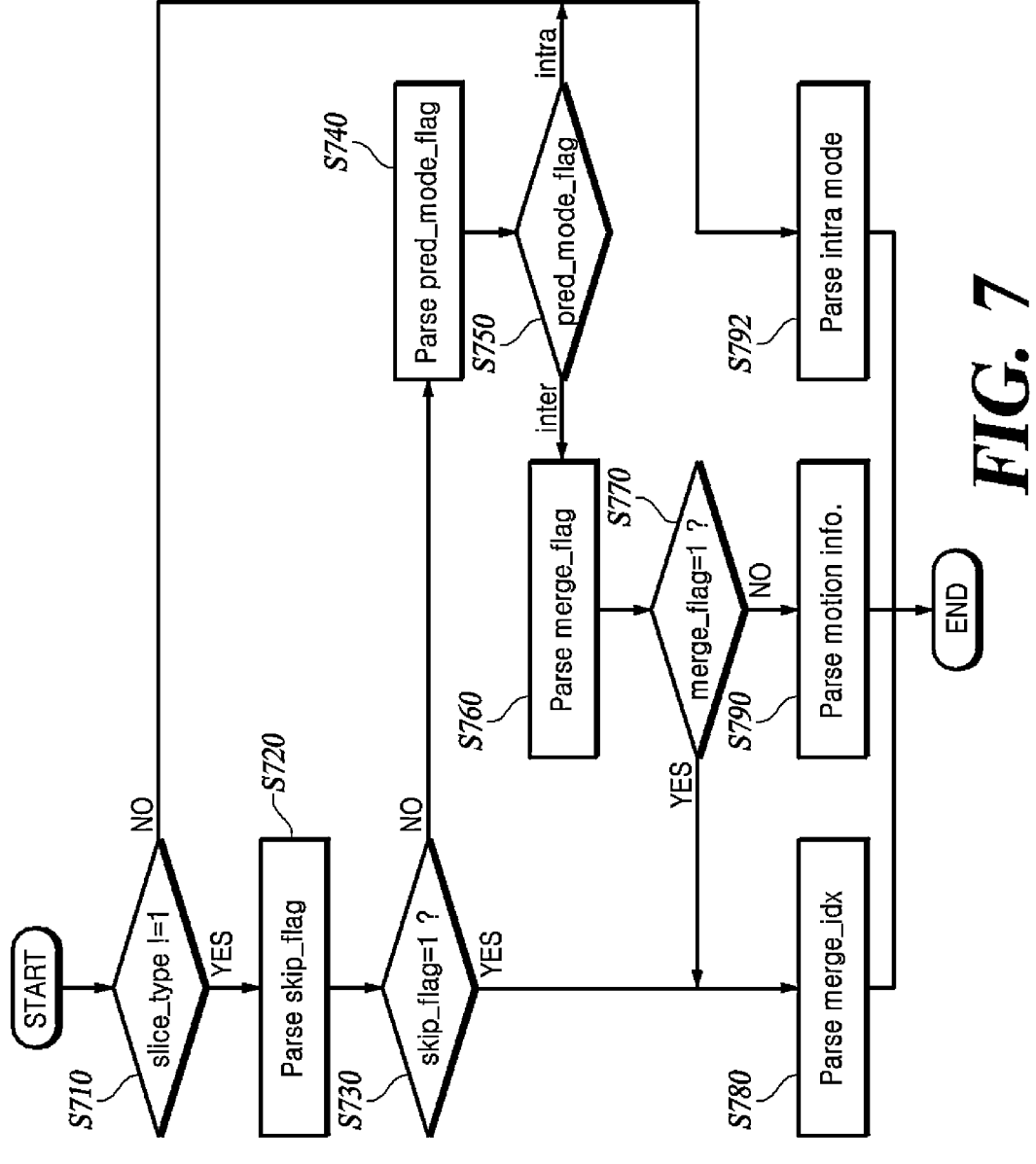

FIG. 7 shows a syntax structure for determining an inter prediction mode and an intra prediction mode for a current block. Inter prediction modes may be divided into a skip mode, a merge mode, and an AMVP (or inter) mode, and the ibc mode may be implemented in all of the inter prediction modes. In the skip mode and merge mode, no explicit signaling occurs about information indicating they are the ibc mode, but rather when the signaled merge_idx indicates the merge candidate of which reference picture is the current picture, the current block is decoded in the ibc mode. In the AMVP mode, when the signaled ref_idx_10 indicates the current picture, the current block is decoded in the ibc mode.

Whether the ibc mode is on or off may be defined through separate flags (sps_curr_pic_ref_enabled_flag and pps_curr_pic_ref_enabled_flag), and Tables 3 and 4 below illustrate an example of defining whether the ibc mode is on or off through each of these flags.

TABLE 3

| | Descriptor |
|---|---|
| sps_scc_extension( ) { | |
| sps_curr_pic_ref_enabled_flag | u(1) |
| palette_mode_enabled_flag | u(1) |
| if( palette_mode_enabled_flag ) { | |
| } | |
| } | |

TABLE 4

| | Descriptor |
|---|---|
| pps_scc_extension( ) { | |
| pps_curr_pic_ref_enabled_flag | u(1) |
| residual_adaptive_colour_transform_enabled_flag | u(1) |
| if( residual_adaptive_colour_transform_enabled_flag ) { | |
| } | |
| pps_palette_predictor_initializer_present_flag | u(1) |
| } | |

In Tables 3 and 4, 'palette_mode_enabled_flag' is a flag indicating whether to turn on or off a palette mode that is another encoding method suitable for SCC, and 'pps_palette_predictor_initializer_present_flag' is a flag indicating initial value setting.

The video encoding apparatus may signal information (palette_mode_flag) indicating whether the current block is encoded in the palette mode to the video decoding apparatus, and the video decoding apparatus may use this information (palette_mode_flag) for determining whether the current block was encoded or in the palette mode or not.

Both the ibc mode and the palette mode are encoding methods suitable for SCC and are encoding methods that have the potential of providing high encoding efficiency in an image or region where the same color or pattern is repeated.

The present disclosure relates to a method of configuring candidate intra modes for a chroma block in intra prediction. In particular, the present disclosure provides a method of deriving candidate intra modes including a DM for the chroma block in the case where block partitions of the luma block and the chroma block are different each other.

Before describing various embodiments of the present disclosure, the main parameters mentioned throughout the present specification will be described.

Classification of Intra Prediction Methods (Modes)

Intra modes used for intra prediction of a chroma block may be classified into a regular intra prediction mode, a cross-component linear model (CCLM) mode, and the like.

Here, the regular intra mode may refer to the 35 types of intra prediction modes described above. However, in the present specification, the present disclosure will be described based on a total of 67 intra prediction modes. The 67 intra prediction modes may be composed of two non-directional modes (planar mode and DC mode) and 65 directional modes, as described in FIG. 3. Through Table 5 below, index values are shown for 67 intra prediction modes corresponding to index 0 to index 66.

TABLE 5

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Indexes 81 to 83 of Table 5 indicate index values of the CCLM modes. The CCLM mode refers to a mode for encoding/decoding a chroma block by using a correlation between luma and chroma. The CCLM mode utilizes the reconstructed value of the luma block on the premise that a linear relationship exists between luma and chroma to generate a prediction value of the chroma block.

The CCLM mode may be classified into three types according to the location of a reference sample used to set a linear relationship between luma and chroma. Specifically, the CCLM mode may be classified into LT_CCLM using both left (L) and upper (T) reference samples, L_CCLM using only the left reference sample, and T_CCLM using only the top reference sample. Index values of 81 to 83 may be assigned to each of LT_CCLM, L_CCLM, and T_CCLM. A flag (cclm_enabled_flag) indicating on/off of the CCLM mode may be defined in one or more positions of a sequence-level header, a picture-level header, and a slice header. When cclm_enabled_flag=1 (CCLM function is on), indices 81 to 83 may be treated as one of the intra prediction methods and signaled from the video encoding apparatus to the video decoding apparatus.

Block Partition Form

Figure 8:
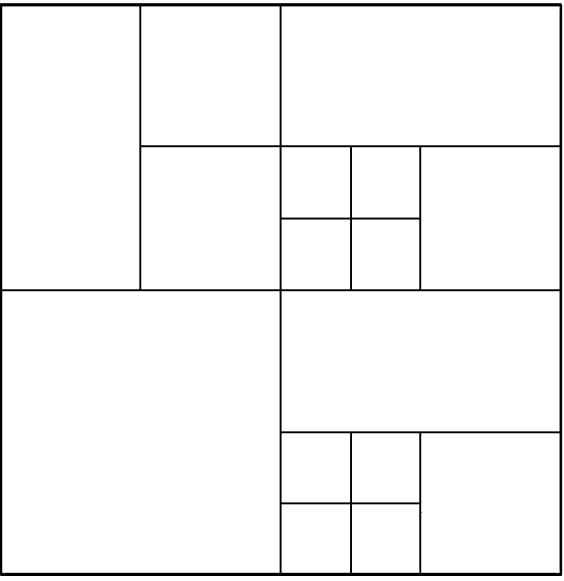
FIG. 8 is a diagram for explaining the partition forms of luma blocks and chroma blocks.
Figure 8:
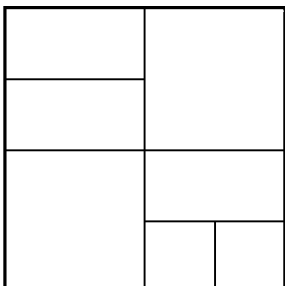

In intra prediction, a luma block and a chroma block may be partitioned into blocks having different shapes (dual tree). FIG. 8 shows example block partition forms in a dual tree. FIG. 8 shows at (a) a block partition form of the luma block in the CTU (Coding Tree Unit), and shows at (b) a partition of the chroma block (cb and cr) corresponding to the luma block in the CTU but a different form from the luma block. Two chroma blocks cb and cr have a common block partition form as shown in FIG. 8 at (b). In FIG. 8, based on the YUV 420 (4:2:0) format, the CTU size for the luma block is set to 32×32, and the CTU size for the chroma blocks (cb and cr) is set to 16×16.

Whether the luma block and the chroma block have different dual trees may be defined in one or more positions of a sequence-level header, a picture-level header, a slice header, or a tile group header. Whether they have a dual tree may be indicated using a separate flag (qtbtt_dual_tree_intra_flag). For example, qtbtt_dual_tree_intra_flag=1 may mean that the luma block and chroma block are dual trees, while qtbtt_dual_tree_intra_flag=0 may mean that the luma block and chroma block are not dual trees (same block partition structure).

This specification describes various embodiments of the present disclosure on the premise that ibc mode or palette mode is activated and the luma block and the chroma block are split into different block partitions (having a dual tree).

Figure 9:
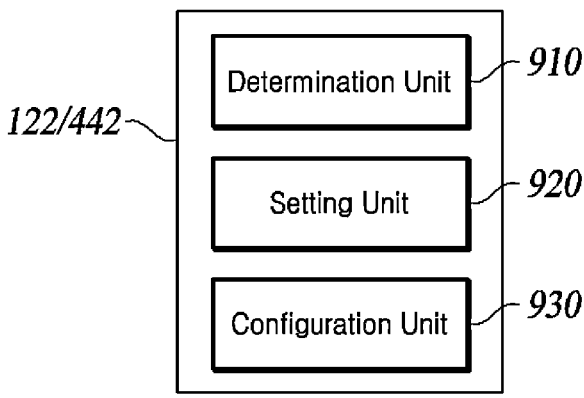
FIG. 9 is a block diagram of an example intra predictor capable of implementing the techniques of the present disclosure.
Figure 10:
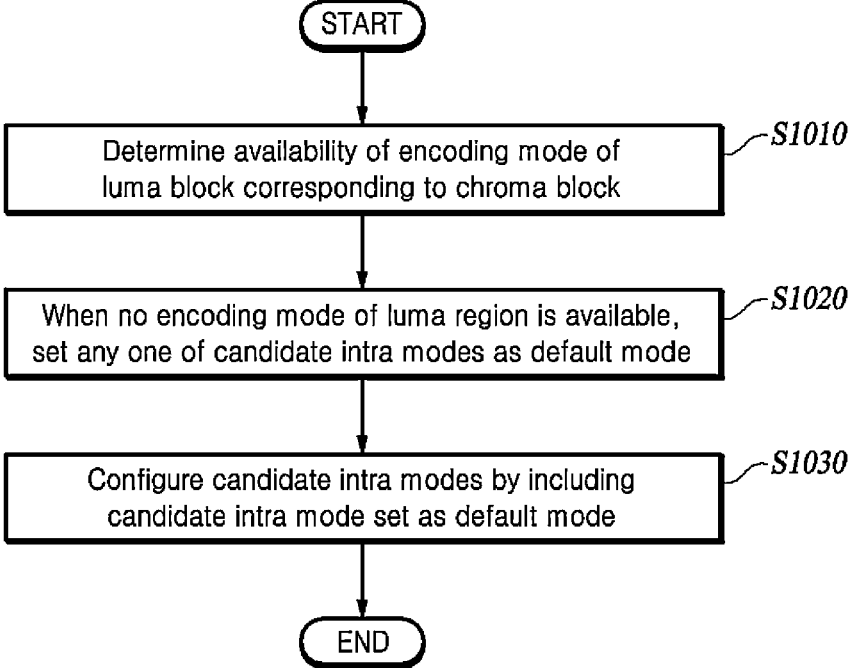
FIG. 10 is a flowchart for explaining at least one embodiment of the present disclosure for configuring candidate intra modes.

As shown in FIG. 9, the video encoding/decoding apparatus may include a determination unit 910, a setting unit 920, and a configuration unit 930.

Step #1

The determination unit 910 may determine whether the encoding mode of the luma region(s) corresponding to the chroma block is available for use (Step S1010).

Luma Region Corresponding to Chroma Block

Figure 11:
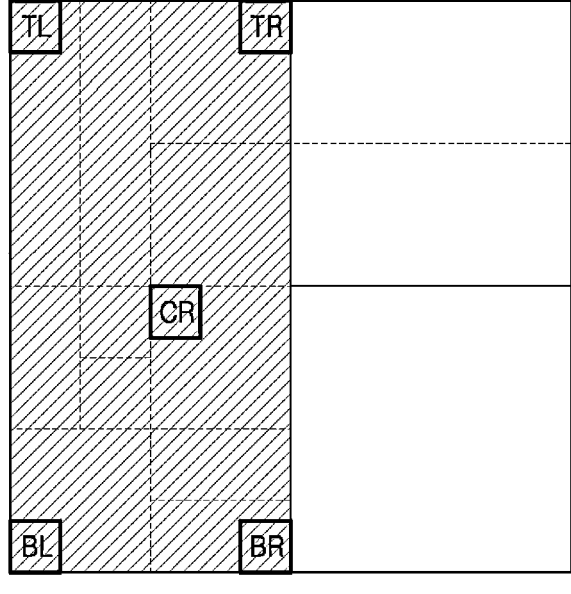
FIG. 11 is a diagram illustrating a luma region corresponding to a chroma block and a reference sample.
Figure 11:
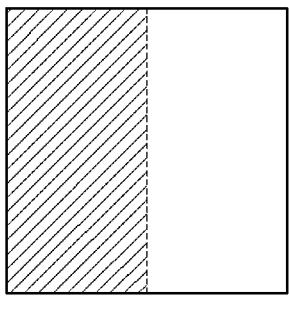

Determination of whether the encoding mode is available may be performed on the luma region(s) corresponding to a chroma block. The correspondence between the chroma block and the luma region may be determined based on whether the chroma block and the luma region are positioned at positions corresponding to each other. An example correspondence of a luma region to a chroma block is shown in FIG. 11. FIG. 11 shows at (a) a CTU composed of one or more luma regions or luma blocks, and FIG. 11 shows at (b) a CTU composed of one or more chroma regions or chroma blocks. The hatched areas represent the correspondence of a plurality of luma regions to one chroma block. In FIG. 11 at (a), the regions indicated by solid and dotted lines represent luma blocks.

As shown in FIG. 11, one or more luma blocks may exist in a luma region that positionally corresponds to one chroma block. For example, a total of 11 luma blocks may be included in a luma region corresponding to a chroma block (chroma region) expressed by hatching. As another example, one luma block may be included in a luma region that positionally corresponds to the chroma block. In this case, the luma region composed of one luma block may be referred to as a luma block, when it may be determined whether the encoding mode of the luma block corresponding to the chroma block is available.

Encoding Mode (Intra Prediction Mode) of Luma Region

The encoding mode of the luma region may be determined by that of any one of the luma blocks located in the luma region. For example, the luma block used for determining the encoding mode may be a luma block including or covering one or more of reference samples located in the luma region. The luma block including one or more reference samples may be referred to as a reference luma block.

Since the encoding mode of the luma region is determined by that of the luma block included therein, Step S1010 may be a process of 'determining the availability of the encoding mode of the luma block corresponding to the chroma block'.

FIG. 11, the reference sample may include a central or CR reference sample located centrally in the luma region, a TL reference sample located on the top left in the luma region, a TR reference sample located on the top right in the luma region, a BL reference sample located on the bottom left in the luma region, and a BR reference sample located on the bottom right in the luma region.

Equations 1 to 5 respectively express a method of setting the encoding mode of the luma block including the reference sample, that is, reference luma block as the DM among candidate intra modes of the chroma block.

$$DmTl = IntraPredModeY[xPb][yPb] \qquad \text{Equation 1}$$

$$DmTr = IntraPredModeY[xPb + (nPbW - 1)][yPb] \qquad \text{Equation 2}$$

$$DmCr = \qquad \text{Equation 3}$$
$$IntraPredModeY[xPb + (nPbW >> 1)][yPb + (nPbH >> 1)]$$

$$DmBl = IntraPredModeY[xPb][yPb + (nPbH - 1)] \qquad \text{Equation 4}$$

$$DmBr = \qquad \text{Equation 5}$$
$$IntraPredModeY[xPb + (nPbW - 1)][yPb + (nPbH - 1)]$$

In the above equations, xPb and yPb represent the top-left position of the luma region, and nPbW and nPbH respectively represent the width and height of the luma region. IntraPredModeY [x][y] means intra prediction information of the luma block at the (x, y) position. In Equation 3 for example, the CR reference sample may be a sample at a position shifted from (xPb, yPb) by half of nPbW on the horizontal axis and by half of nPbH on the vertical axis.

Since the position of the TL reference sample is (xPb, yPb), Equation 1 indicates that the encoding mode of the reference luma block including the TL reference sample is set to DM (DmTI). Since the position of the TR reference sample is (xPb+(nPbW−1), yPb), Equation 2 indicates that the encoding mode of the reference luma block including the TR reference sample is set to DM (DmTr). Since the position of the CR reference sample is (xPb+(nPbW>>1), yPb+(nPbH>>1)), Equation 3 indicates that the encoding mode of the reference luma block including the CR reference sample is set to DM (DmCr). Since the position of the BL reference sample is (xPb, yPb+(nPbH−1)), Equation 4 indicates that the encoding mode of the reference luma block including the BL reference sample is set to DM (DmBI). Since the position of the BR reference sample is (xPb+(nPbW−1), yPb+(nPbH−1)), Equation 5 indicates that the encoding mode of the reference luma block including the BR reference sample is set to DM (DmBr).

Availability of Encoding Mode

As described above, the intra modes for the intra prediction of the chroma block may be classified into a regular intra mode, a CCLM mode, and the like. The intra modes for the intra prediction of the luma block may be classified into a regular intra mode, an ibc mode, a palette mode, and the like.

In the present disclosure, when the encoding mode of the luma region (reference luma block) corresponds to the regular intra mode, it may be determined that the same encoding mode is available for use as the DM mode for the chroma block. On the other hand, when the encoding mode of the luma region corresponds to the ibc mode or the palette mode (not to the regular intra mode), it may be determined that the encoding mode of the corresponding luma region is unavailable.

The order of determination of the availability may be changed. For example, it may be first determined whether the encoding mode of the luma region corresponds to the ibc mode or the palette mode, and determined later whether that the encoding mode corresponds to the regular intra mode. As another example, whether the encoding mode of the luma region corresponds to the regular intra mode may be first determined, and it may be determined later whether that encoding mode corresponds to the ibc mode or the palette mode.

When it is first determined whether the encoding mode of the luma region corresponds to the ibc mode or the palette mode, if yes, the encoding mode of the luma region may be determined not to be available. On the contrary, if that encoding mode does not correspond to the ibc mode or the palette mode, it may be determined that the encoding mode of the luma region may be determined to be available for use as the DM mode.

Information (ibc_enabled_flag) for controlling activation or deactivation of the ibc mode may be defined in one or more positions of a sequence-level header, a picture-level header, a slice header, or a tile group header. Similarly, information (pcm_enabled_flag) indicating activation/deactivation of the palette mode may also be defined in one or more positions of the sequence-level header, picture-level header, slice header, or tile group header.

Meanwhile, to determine the encoding mode of the luma region (luma block), the encoding mode (encoding information) of the luma region needs to be preset or stored. FIG. 12 shows an example in which the encoding mode of the luma block is pre-stored in the memory 190, 470 in units of N×N (N is a positive integer).

FIG. 12 shows at (a) luma blocks #1 to #16 separated by solid lines, and FIG. 12 shows (b) a format in which encoding modes of luma blocks are stored for a total of 64 divided regions in a 4×4 unit. As an example, when the encoding modes of the luma blocks corresponding to #2, #9, and #12 in (a) of FIG. 12 belong to unavailable modes, a specific mode may be stored in (b) of FIG. 12 at four #2 regions, four #9 regions, and one #12 region. This specific mode may be a mode prepared in case the encoding modes of the luma blocks are not available.

Step #2

When it is determined whether the encoding mode of the luma region is available, the setting unit 920 may set the encoding mode for any one of the candidate intra modes (S1020). The target to set the encoding mode by the setting unit 920 may be a DM included in the candidate intra modes of the chroma region.

When the encoding mode of the luma region is available (encoding was performed in the regular intra mode), the setting unit 920 may set the DM as the encoding mode of the relevant luma region. On the contrary, when the encoding mode of the luma region is not available (encoding was performed in the ibc mode or the palette mode), the setting unit 920 may set the DM as the default mode.

Default Mode

Any one of the regular intra modes may be set as a default mode. In particular, the default mode may be a planar mode, a DC mode, or a directional mode. The following description assumes that the default mode is equivalent to the DC mode.

Step #3

The configuration unit 930 may configure candidate intra modes by including the candidate intra mode (DM) set as the default mode (DC mode) (S1030).

Tables 6 and 7 show examples of configuring candidate intra modes for a chroma block. Table 6 shows candidate intra modes when the CCLM mode is turned off, and Table 7 candidate intra modes when the CCLM mode is turned on.

TABLE 6

| intra_chroma_pred_mode[xCb][yCb] | IntraPredModeY[xCb + cbWidth/2][yCb + cbHeight/2] | | | | |
| --- | --- | --- | --- | --- | --- |
| | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 7

| intra_chroma_pred_mode[xCb][yCb] | IntraPredModeY[xCb + cbWidth/2][yCb + cbHeight/2] | | | | |
| --- | --- | --- | --- | --- | --- |
| | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

In Tables 6 and 7, the fourth index represents DM. Candidate intra modes excluding CCLM mode may include five candidate intra modes (planar, vertical, horizontal, DC, and DM). When DM matches any one of planar, vertical, horizontal, and DC, directional mode No. 66 is added to configure five candidate intra modes.

For example, when DM is set to planar, candidate intra modes may include directional mode No. 66, vertical, horizontal, DC, and DM (planar). When DM is set to DC, candidate intra modes may include planar, vertical, horizontal, directional mode No. 66, and DM (DC).

Table 8 shows the binarization method for Table 6 (when the CCLM mode is off), and Table 9 shows the binarization method for Table 7 (when the CCLM mode is on). As shown in Tables 8 and 9, relatively few bits are allocated to the DM, exhibiting the superior compression performance of the DM to that of other mode candidates.

TABLE 8

| Value of intra_chroma_pred_mode | Bin string |
| --- | --- |
| 4 | 0 |
| 0 | 100 |
| 1 | 101 |
| 2 | 110 |
| 3 | 111 |

TABLE 9

| Value of intra_chroma_pred_mode | Bin string |
| --- | --- |
| 5 | 10 |
| 6 | 110 |
| 7 | 111 |
| 4 | 00 |

TABLE 9-continued

| Value of intra_chroma_pred_mode | Bin string |
| --- | --- |
| 0 | 0100 |
| 1 | 0101 |
| 2 | 0110 |
| 3 | 0111 |

When the CCLM mode is on (Table 9), signaling differs according to a flag (cclm_mode_flag) value indicating whether it is a regular intra mode or a CCLM mode. When in a regular intra mode (cclm_mode_flag=0), the intra mode index value is signaled. When in the CCLM mode (cclm_mode_flag=1), the CCLM mode index (cclm_mode_idx) value is additionally signaled. In regular intra mode, the same codewords as in Table 8 are allocated to the regular intra mode indexes of 0 to 4, and in the CCLM mode, the truncated rice (TR) method is applied so that codewords of "0," "10," and "11" are assigned to the CCLM mode indexes 5 to 7.

Embodiment 1

The intra predictor 122/442 may determine whether the encoding mode (mode_luma) of the luma region corresponding to the chroma block is regular intra mode (whether the encoding mode is available or not) (S1310). The encoding mode of the luma region may be the encoding mode of any one of a luma block including a CR reference sample, a luma block including a TL reference sample, a luma block including a TR reference sample, a luma block including a BL reference sample, and luma including a BR reference sample.

When the encoding mode of the luma region is the regular intra mode, the intra predictor 122/442 may set the encoding mode of the luma region to DM (S1320). On the contrary, when the encoding mode of the luma region is not the regular intra mode (but corresponds to the ibc mode or the palette mode), the intra predictor 122/442 may set the DC mode (default mode) to DM (S1330).

Figure 13:
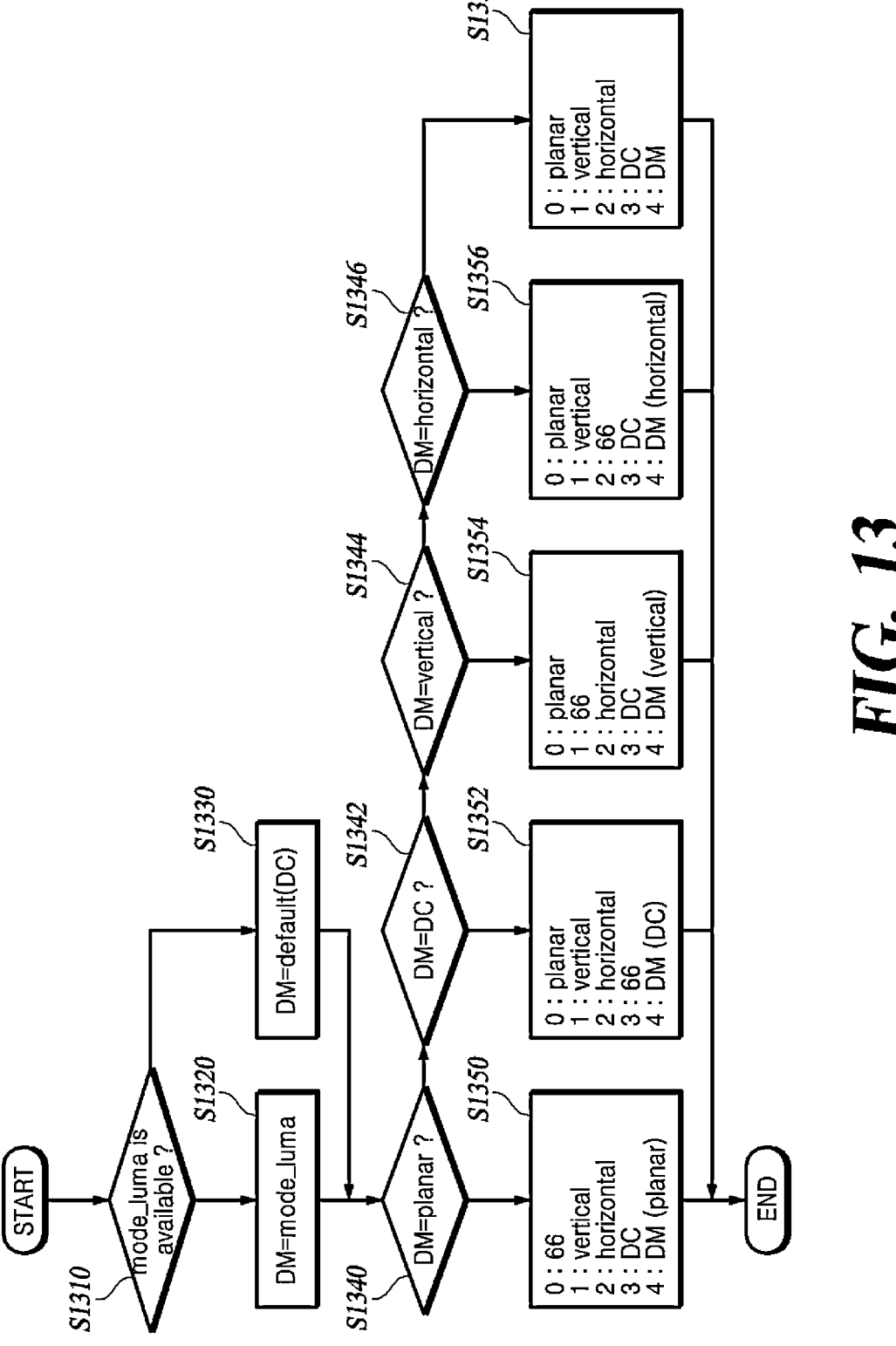
FIGS. 13 to 18 are diagrams illustrating various embodiments for configuring candidate intra modes.

When the DM is set, the intra predictor 122/442 may configure candidate intra modes of the chroma block by including the DM (S1340 to S1358). When the DM matches any one of the other candidate intra modes (planar, vertical, horizontal, and DC), directional mode No. 66 may be added to configure five candidate intra modes. Steps S1340, S1342, S1344, and S1346 are processes of comparing the DM with other candidate intra modes to determine whether they are the same. Although FIG. 13 illustrates determining whether the DM is the same as other candidate intra modes in the order of planar→DC→vertical→horizontal, this order may be changed.

Table 10 below shows an example of candidate intra modes configured according to DM with the encoding mode of the luma region determined as the encoding mode of the reference luma block including the CR reference sample. As shown in Table 10, when DM is set to DC (1), candidate intra modes may include 0: planar (0), 1: vertical (50), 2: horizontal (18), 3: directional mode No. 66, and 4: DM (DC=1).

exist in one luma region, there may be one or a plurality of reference luma blocks including these reference samples. When a plurality of reference luma blocks exists for one luma region, the encoding mode of each of the plurality of reference luma blocks is checked to determine the encoding mode of the luma region.

The intra predictor 122/442 may determine whether the encoding mode (mode_luma) of the luma region corresponding to the chroma block is the regular intra mode (S1510, S1512). The intra predictor 122/442 may search for a plurality of reference samples in a preset order and determine whether an encoding mode for reference luma blocks is available for use. For example, when the CR reference sample and the TL reference sample are present in the luma region, the intra predictor 122/442 may search the reference samples in the order of CR→TL or TL→CR and determine the availability of the encoding mode of the reference luma blocks including the respective reference samples (S1510 and S1512). The preset order may vary, for example, may be a raster-scan order of 4×4 units. For example, Step S1512 may be performed when the encoding mode of the reference luma block including the CR reference sample is not available in Step S1510.

Upon detecting a reference luma block encoded in the regular intra mode in the process of determining the availability in the preset order, the encoding mode of the relevant luma region may be determined as being available. Upon

TABLE 10

| intra_chroma_pred_mode[xCb][yCb] | IntraPredModeY[xCb + cbWidth >> 1][yCb + cbHeight >> 1] | | | | |
|---|---|---|---|---|---|
| | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

Figure 14:
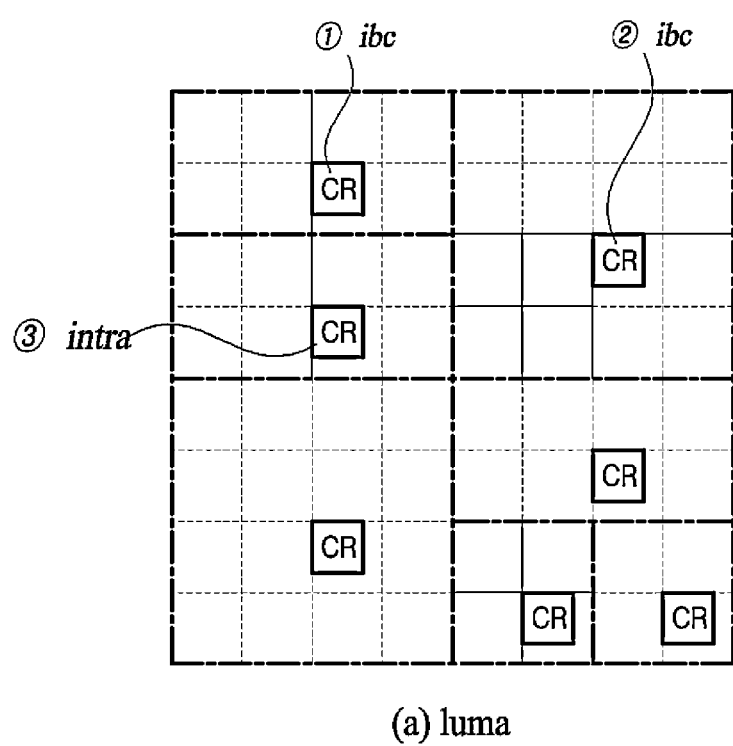
Figure 14:
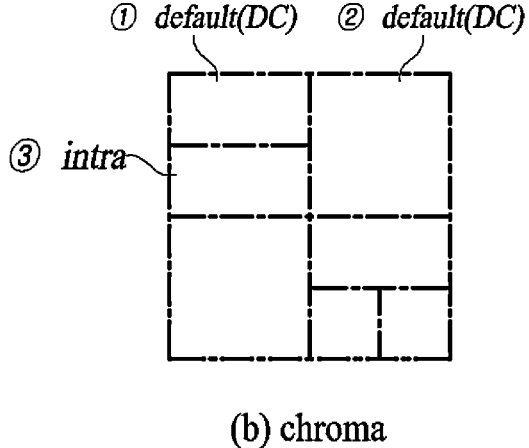

FIG. 14 illustrates an example to which the method of Embodiment 1 is applied. FIG. 14 shows at (a) luma regions, and shows at (b) chroma regions. It is assumed that the encoding modes of the luma regions are each determined by an encoding mode of the reference luma block including the CR reference sample included in each luma region. Additionally, it is assumed that the encoding mode of a luma region ① and the encoding mode of a luma region ② are the ibc mode, and the encoding mode of a luma region ③ is the intra mode.

Since the coding mode of luma region ① positionally corresponding to a chroma block ① is the ibc mode, the DM of the chroma block ① may be set as the DC mode (default mode). Since the coding mode of luma region ② positionally corresponding to a chroma block ② is the ibc mode, the DM of chroma block ② may also be set as the DC mode. The encoding mode of luma region ③ positionally corresponding to a chroma block ③ is an intra mode, and thus the DM of chroma block ③ may be set to be the same as the encoding mode of luma region ③.

Embodiment 2

Embodiment 2 is a method of determining an encoding mode of a luma region by using a plurality of reference samples.

As described above, the luma region may include one or more reference samples. When multiple reference samples detecting a plurality of reference luma blocks encoded in the regular intra mode, the encoding mode of the first searched reference luma block may be treated as an encoding mode of the luma region. On the contrary, with no detection of a reference luma block encoded in the regular intra mode (when none of the encoding modes of the reference luma blocks are available for use), it may be determined that the encoding mode of the relevant luma region is not available.

When the encoding mode of the luma region is encoded in the regular intra mode, the intra predictor 122/442 may set the encoding mode of the luma region to DM (S1520, S1522). For example, when the encoding mode of the luma region is the encoding mode of the reference luma block including the CR reference sample, the DM may be set as the encoding mode of this reference luma block (S1520). As another example, when the encoding mode of the luma region is the encoding mode of the reference luma block including the TL reference sample, the DM may be set as the encoding mode of this reference luma block (S1522).

On the contrary, when the encoding mode of the luma region is not the regular intra mode, the intra predictor 122/442 may set the DC mode (default mode) to DM (S1530).

Figure 15:
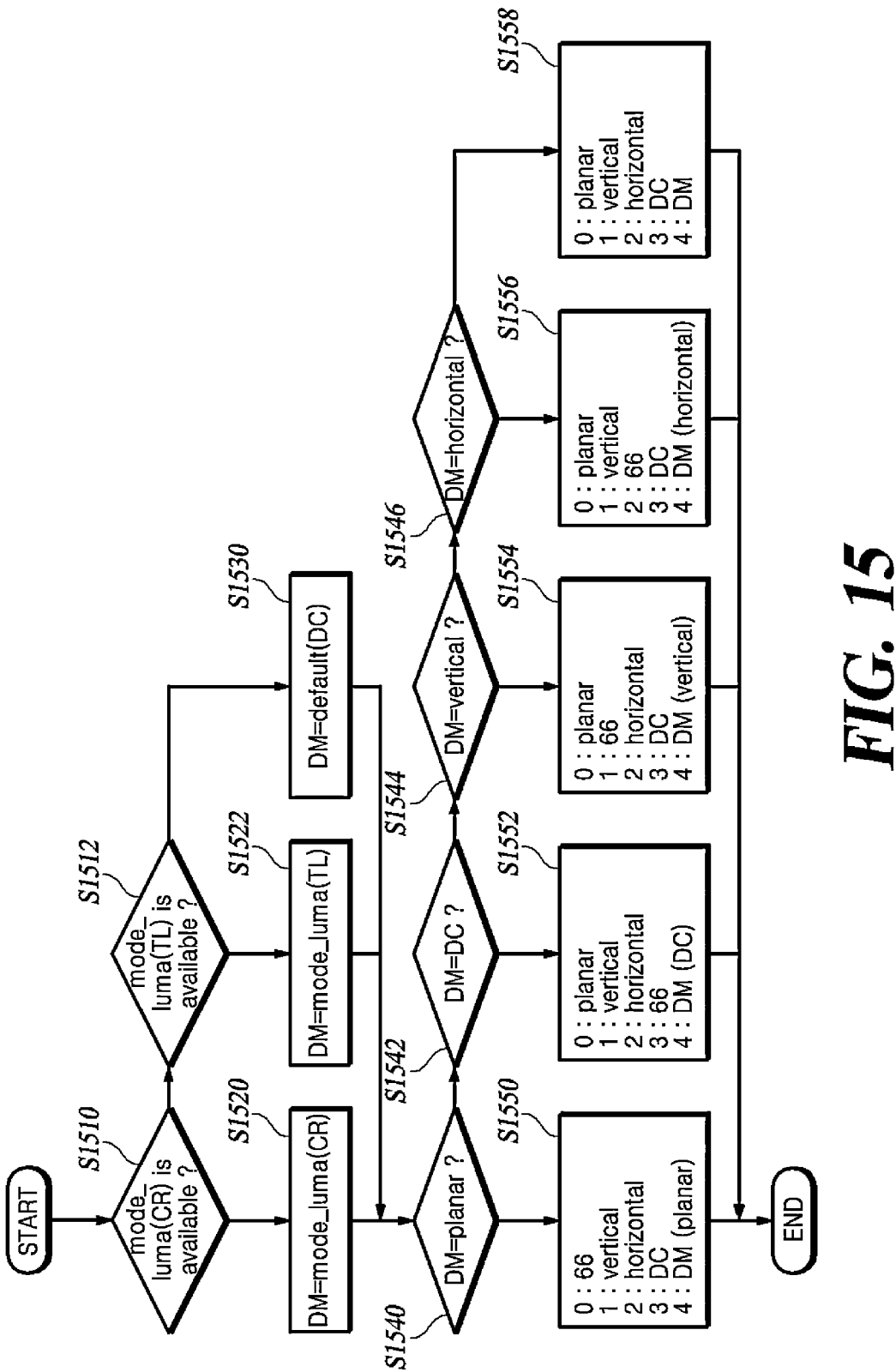

When the DM is set, the intra predictor 122/442 may configure candidate intra modes by including the DM (S1540 to S1558). When the DM is equal to any one of the other candidate intra modes (planar, vertical, horizontal, and DC), directional mode No. 66 is added to configure five candidate intra modes. Steps S1540, S1542, S1544, and S1546 are processes for comparing the DM with other candidate intra modes to determine whether they are the same. Although FIG. 15 illustrates determining whether the DM is the same as other candidate intra modes in the order of planar→DC→vertical→horizontal, this order may be changed.

Figure 16:
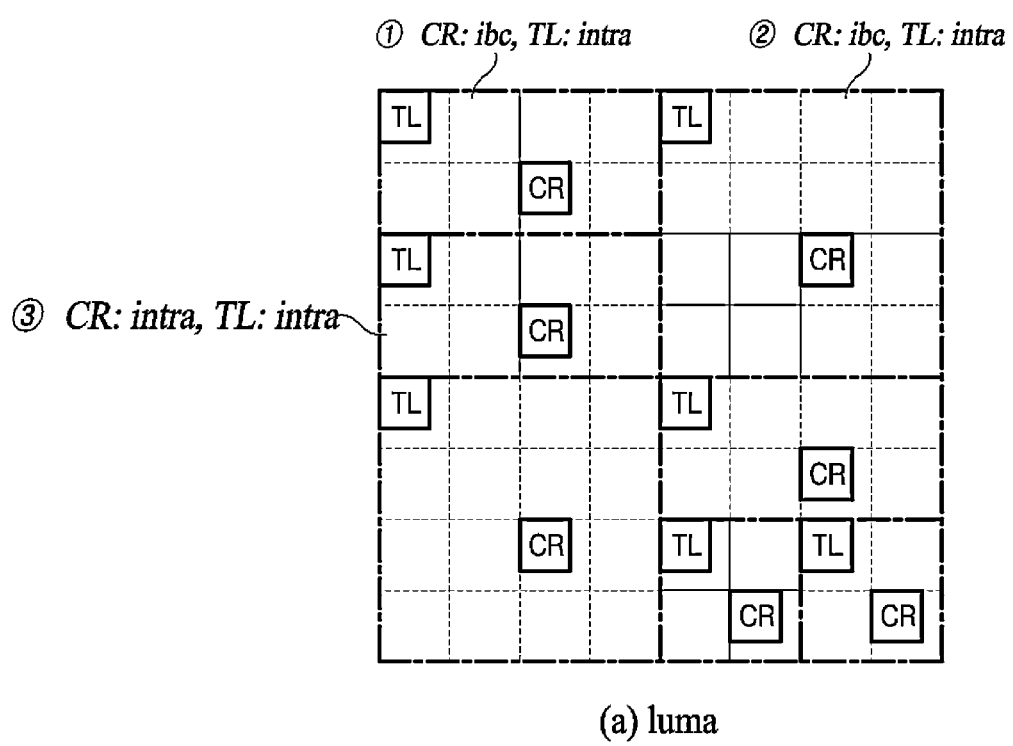
Figure 16:
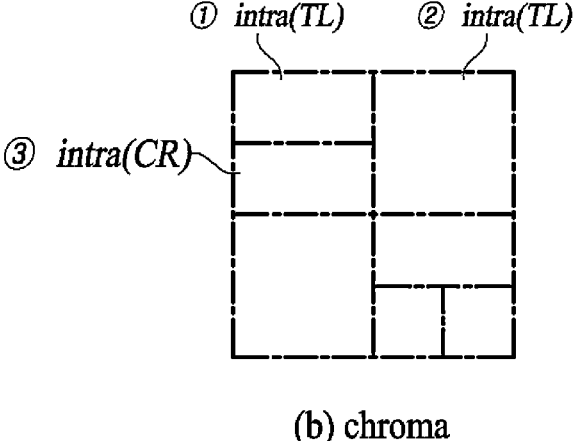

FIG. 16 illustrates an example to which the method of Embodiment 2 is applied. FIG. 16 shows at (a) luma regions, and shows at (b) chroma regions. It is assumed that the luma regions include CR reference samples and TL reference samples and that the availability of the encoding mode of the luma region is determined by searching the reference samples in the order of CR→TL.

In a luma region ① positionally corresponding to a chroma block ①, the encoding mode of the reference luma block including the CR reference sample is the ibc mode, and the encoding mode of the reference luma block including the TL reference sample is the intra mode. Accordingly, the DM of chroma block ① may be set to the intra mode (intra (TL)) of the reference luma block including the TL reference sample.

In a luma region ② positionally corresponding to a chroma block ②, the encoding mode of the reference luma block including the CR reference sample is the ibc mode, and the encoding mode of the reference luma block including the TL reference sample is the intra mode. Accordingly, the DM of the second chroma block may be set to the intra mode (intra(TL)) of the reference luma block including the TL reference sample.

In a luma region ③ positionally corresponding to a chroma block ③, the encoding mode of the reference luma block including the CR reference sample and the encoding mode of the reference luma block including the TL reference sample are the intra mode. Accordingly, the DM of chroma block ③ may be set to the intra mode (intra(CR)) of the reference luma block including the CR reference sample.

As described above, Embodiment 2 checks the encoding modes of the plurality of luma blocks to determine the encoding mode of the luma region, which can provide a more accurate setting of the DM.

Embodiment 3

Embodiment 3 is a method of additionally checking the encoding modes of neighboring blocks adjacent to the relevant chroma block when the encoding mode of the luma region is not available.

Figure 18:
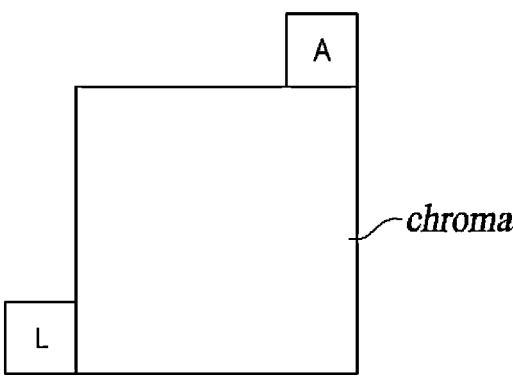

As shown in FIG. 18, the neighboring blocks adjacent to the chroma block (current block) may include a neighboring block L located on the left side of the chroma block and a neighboring block A located above the chroma block.

The intra predictor 122/442 may determine whether the encoding mode (mode_luma) of the luma region corresponding to the chroma block is the regular intra mode (S1710). If yes, the intra predictor 122/442 may set the encoding mode of the luma region to DM (S1720).

On the contrary, when the encoding mode of the luma region is not the regular intra mode, the intra predictor 122/442 may further determine whether the encoding mode of one or more neighboring blocks adjacent to the chroma block is available (S1712, S1714).

The intra predictor 122/442 may determine whether the encoding modes of the neighboring blocks are available by sequentially searching the neighboring blocks. For example, the intra predictor 122/442 first determines whether the encoding mode (mode_chroma(L)) of the neighboring block L is available (S1712), and if not, it may proceed to determine whether the encoding mode (mode_chroma(A)) of the neighboring block A is available (S1714).

In Step S1712, when the encoding mode of the neighboring block L is available, DM may be set as the encoding mode of the neighboring block L. In Step S1714, when the encoding mode of the neighboring block A is available, DM may be set as the encoding mode of the neighboring block A. When none of the encoding modes of the neighboring blocks are available for use, the DC mode (default mode) may be set as DM (S1730).

Figure 17:
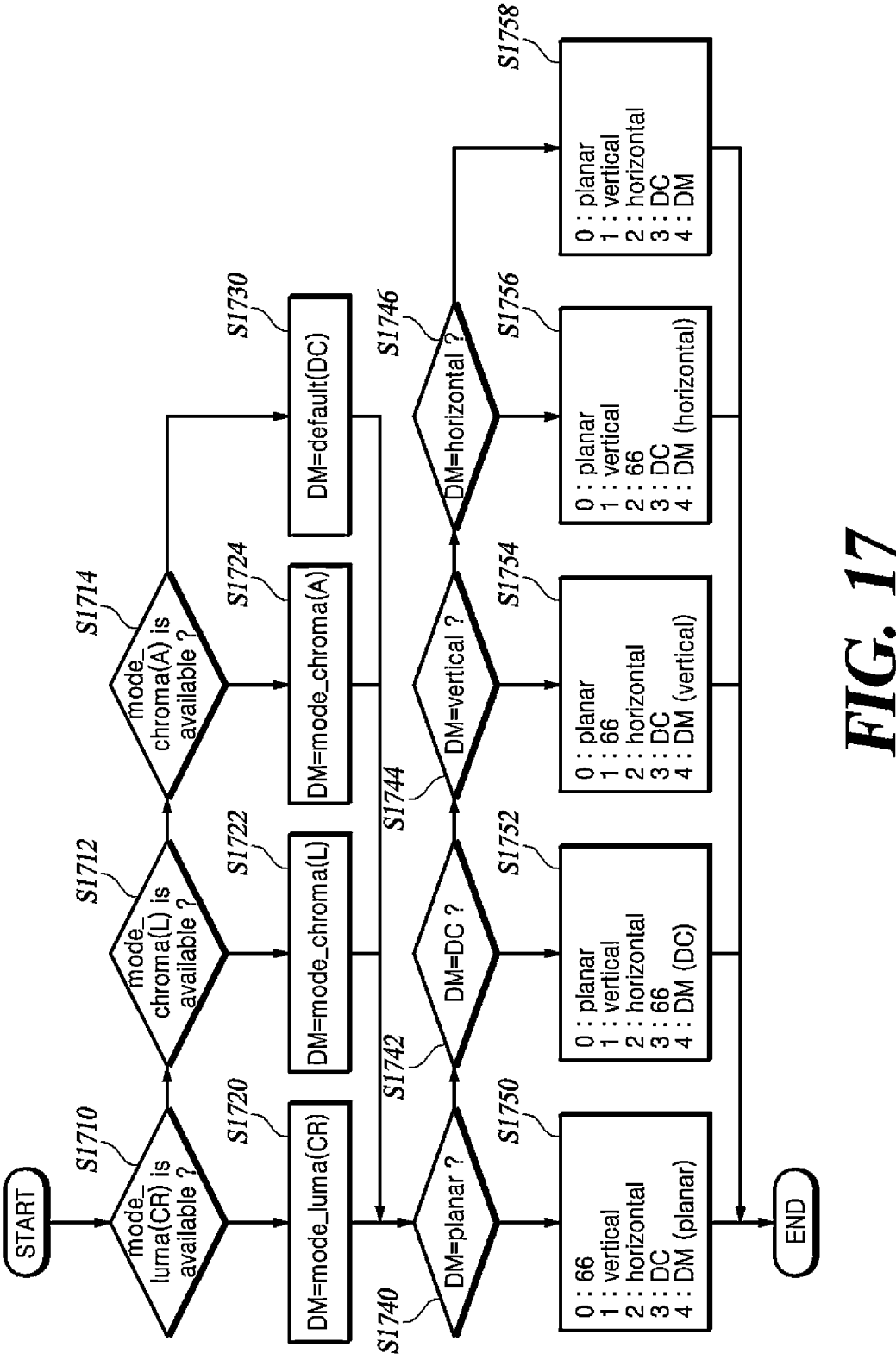

When the DM is set, the intra predictor 122/442 may configure candidate intra modes by including the DM (S1740 to S1758). When the DM matches any one of the other candidate intra modes (planar, vertical, horizontal, and DC), directional mode No. 66 is added to configure five candidate intra modes. Steps S1740, S1742, S1744, and S1746 are processes for comparing the DM with other candidate intra modes to determine whether they are the same. Although FIG. 17 illustrates determining whether the DM is the same as other candidate intra modes in the order of planar→DC→vertical→horizontal, this order may be changed.

Embodiment 4

Embodiment 4 is about a method of exclusively selecting activation/deactivation or application/non-application of ibc mode, palette mode, and DM mode.

The selection may be performed in a level of a sequence, a picture, a slice, a tile group, and/or a CTU. For example, the slice header (or tile group header) may be arranged to hold information (flag information) indicating whether the ibc mode is applied or not, to determine whether to use the ibc mode in the relevant slice. According to the information indicating whether ibc mode is applied or not, a specific slice may have ibc mode activated exclusively therein (with DM or pcm mode deactivated), and other slices may have DM or palette mode activated exclusively therein (with ibc mode deactivated). As another example, the CTU header may be arranged to hold information (flag information) indicating whether DM is applied or not, to determine whether to use DM for each CTU unit.

Information (dm_enabled_flag) capable of enabling/disabling DM may be located in one or more of a sequence-level header, a picture-level header, a slice header, or a tile group header. When DM is turned off (dm_enabled_flag=0), the very process of setting DM may be omitted.

In this case, the number of candidate intra modes may be changed, and a binarization method for expressing them may also be changed. For example, when only DM is activated (with ibc and palette deactivated), candidate intra modes may be configured as shown in Table 6, and DM may be set as in Steps S1358, S1558, and S1758. As another example, when only ibc mode or palette mode is activated (with DM deactivated), candidate intra modes may be configured as shown in Tables 11 and 12 below. Table 11 shows a case where the CCLM mode is turned off, and Table 12 a case where the CCLM mode is turned on.

TABLE 11

| intra_chroma_pred_mode[xCb][yCb] | mode | Bin string |
|---|---|---|
| 0 | 0 | 00 |
| 1 | 50 | 01 |

21

TABLE 11-continued

| intra_chroma_pred_mode[xCb][yCb] | mode | Bin string |
|---|---|---|
| 2 | 18 | 10 |
| 3 | 1 | 11 |

TABLE 12

| intra_chroma_pred_mode[xCb][yCb] | mode | Bin string |
|---|---|---|
| 0 | 0 | 1000 |
| 1 | 50 | 1001 |
| 2 | 18 | 1010 |
| 3 | 1 | 1011 |
| 4 | 81 | 0 |
| 5 | 82 | 110 |
| 6 | 83 | 111 |

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A video encoding method, performed by a video encoding apparatus, comprising:

determining a chroma block, that is comprised of chrominance components of pixels in a current block to be encoded in a current picture, at least based on partitioning a coding tree block (CTB) into a plurality of blocks based on partition tree structure;

configuring candidate intra modes for the chroma block using a plurality of intra modes, the candidate intra modes including a direct mode (DM) which is an intra mode of a luma region corresponding to the chroma block;

selecting an intra mode of the chroma block from the candidate intra modes; and encoding information for indicating the selected intra mode, wherein the configuring of the candidate intra modes comprises:

determining whether the luma region corresponding to the chroma block has an encoding mode that is available for use as the intra mode of the chroma block, wherein the encoding mode of the luma region is determined to be unavailable when the encoding mode of the luma region is an intra block copy (ibc) mode in which an intra prediction is performed using a reference block that is indicated by a motion vector in the current picture; and setting the DM as a predefined default mode other than the ibc mode when the encoding mode of the luma region is unavailable.

2. The method of claim 1, wherein the default mode is an intra DC mode.

3. The method of claim 1, wherein the encoding mode of the luma region comprises:

an encoding mode of a reference luma block that is among one or more luma blocks included in the luma region and that covers at least one reference sample located in the luma region.

4. The method of claim 3, wherein the reference sample comprises:

a central (CR) reference sample located centrally in the luma region.

5. The method of claim 1, wherein the setting of the DM comprises:

setting the DM as the encoding mode of the luma region when the encoding mode of the luma region is available.

6. The method of claim 1, wherein the configuring of the candidate intra modes comprises:

configuring the candidate intra modes by setting, as a directional mode 66, a candidate intra mode among the candidate intra modes which is identical to the DM.

7. A video decoding apparatus for intra-predicting a chroma block that is comprised of chrominance components of pixels in a current block to be encoded in a current picture, the apparatus comprising:

a partition unit configured to partition a coding tree block (CTB) into a plurality of blocks based on partition tree structure and determine the chroma block among the plurality of blocks;

a configuration unit configured to configure candidate intra modes for the chroma block using a plurality of intra modes, the candidate intra modes including a direct mode (DM) which is an intra mode of a luma region corresponding to the chroma block; and a decoder configured to decode information for indicating an intra mode of the chroma block among the candidate intra modes to determine the intra mode of the chroma block based on the decoded information, wherein the apparatus further comprises:

a determination unit configured to determine whether the luma region corresponding to the chroma block has an encoding mode that is available for use as the intra mode of the chroma block, wherein the encoding mode of the luma region is determined to be unavailable when the encoding mode of the luma region is an intra block copy (ibc) mode in which an intra prediction is performed using a reference block that is indicated by a motion vector in the current picture; and a setting unit configured to set the DM as a predefined default mode other than the ibc mode when the encoding mode of the luma region is unavailable.

8. The apparatus of claim 7, wherein the default mode is an intra DC mode.

9. The apparatus of claim 7, wherein the encoding mode of the luma region comprises:

an encoding mode of a reference luma block that is among one or more luma blocks included in the luma region and that covers at least one reference sample located in the luma region.

10. The apparatus of claim 9, wherein the reference sample comprises:

a central (CR) reference sample located centrally in the luma region.

11. The apparatus of claim 7, wherein the setting unit is configured to set the DM as the encoding mode of the luma region when the encoding mode of the luma region is available.

12. The apparatus of claim 7, wherein the configuration unit is configured to configure the candidate intra modes by setting, as a directional mode 66, a candidate intra mode among the candidate intra modes which is identical to the DM.

13. A method, performed by an encoder comprising at least one processor, for transmitting a bitstream containing encoded video data, the method comprising:

generating the bitstream by using intra-prediction; and transmitting the bitstream, wherein generating the bitstream comprises:

determining a chroma block, that is comprised of chrominance components of pixels in a current block to be encoded in a current picture, at least based on partitioning a coding tree block (CTB) into a plurality of blocks based on partition tree structure;

configuring candidate intra modes for the chroma block using a plurality of intra modes, the candidate intra modes including a direct mode (DM) which is an intra mode of a luma region corresponding to the chroma block;

selecting an intra mode of the chroma block from the candidate intra modes; and encoding information for indicating the selected intra mode, wherein the configuring of the candidate intra modes comprises:

determining whether the luma region corresponding to the chroma block has an encoding mode that is available for use as the intra mode of the chroma block, wherein the encoding mode of the luma region is determined to be unavailable when the encoding mode of the luma region is an intra block copy (ibc) mode in which an intra prediction is performed using a reference block that is indicated by a motion vector in the current picture; and setting the DM as a predefined default mode other than the ibc mode when the encoding mode of the luma region is unavailable.

* * * * *